(12) United States Patent
Gisquet et al.

(10) Patent No.: US 10,735,733 B2
(45) Date of Patent: Aug. 4, 2020

(54) METHOD AND DEVICE FOR ENCODING VIDEO DATA

(71) Applicants: CANON KABUSHIKI KAISHA, Tokyo (JP); AXIS AB, Lund (SE)

(72) Inventors: Christophe Gisquet, Acigné (FR); Patrice Onno, Rennes (FR); Guillaume Laroche, Saint-Aubin-d'Aubigné (FR)

(73) Assignees: Canon Kabushiki Kaisha, Tokyo (JP); Axis AB, Lund (SE)

( * ) Notice: Subject to any disclaimer, the term of this patent is extended or adjusted under 35 U.S.C. 154(b) by 0 days.

(21) Appl. No.: 16/205,691

(22) Filed: Nov. 30, 2018

(65) Prior Publication Data
US 2019/0191162 A1 Jun. 20, 2019

(30) Foreign Application Priority Data
Dec. 18, 2017 (EP) .................................... 17306812

(51) Int. Cl.
*H04N 19/124* (2014.01)
*H04N 19/18* (2014.01)
*H04N 19/176* (2014.01)

(52) U.S. Cl.
CPC ......... *H04N 19/124* (2014.11); *H04N 19/176* (2014.11); *H04N 19/18* (2014.11)

(58) Field of Classification Search
CPC ..... H04N 19/124; H04N 19/176; H04N 19/18
See application file for complete search history.

(56) References Cited

U.S. PATENT DOCUMENTS 5,307,163 A * 4/1994 Hatano ................ H04N 19/176
375/240.12
5,604,502 A 2/1997 Haskell et al.
(Continued)

FOREIGN PATENT DOCUMENTS

JP H08-009375 A 1/1996
JP 2006-157881 A 6/2006

OTHER PUBLICATIONS

JP 2006-157881 A, U.S. Pat. No. 5,604,502.
(Continued)

*Primary Examiner* — Marnie A Matt
(74) *Attorney, Agent, or Firm* — Venable LLP

(57) ABSTRACT

The present invention concerns a method for encoding a video sequence, comprising the following steps by a processing unit of an encoding device:
splitting an image from the video sequence into blocks of values;
for each block:
transforming the values of the block into transform coefficients;
organizing these transform coefficients into several sets of transform coefficients;
quantizing the transform coefficients into quantized coefficients;
encoding the block using the quantized coefficients;
encoding the video sequence based on the encoding of the blocks;
wherein the quantizing step further comprises for quantized coefficients corresponding to one set of transform coefficients:
determining scaled coefficients where a scaled coefficient is based on a transform coefficient of the one set, by multiplying the transform coefficient by a factor parameter and then adding a deadzone param-
(Continued)

eter, the deadzone parameter being scaled linearly with the index k of the transform coefficient within the set of transform coefficients;

shifting each scaled coefficient to obtain a corresponding quantized coefficient;

comparing a sum value representative of a summing result of magnitudes of the quantized coefficient values corresponding to the set of transform coefficients, with a threshold; and setting the quantized coefficients corresponding to the set of transform coefficients to zero, if the summing result is below the threshold.

7 Claims, 8 Drawing Sheets

(56) References Cited

U.S. PATENT DOCUMENTS

| | | | |
|---|---|---|---|
| 6,501,860 B1 | 12/2002 | Charrier et al. | |
| 6,891,895 B1 | 5/2005 | Onno et al. | |
| 7,113,643 B2 | 9/2006 | Le Leannec et al. | |
| 7,190,838 B2 | 3/2007 | Le Leannec et al. | |
| 7,212,678 B2 | 5/2007 | Brown et al. | |
| 7,215,819 B2 | 5/2007 | Onno et al. | |
| 7,260,264 B2 | 8/2007 | Guillou et al. | |
| 7,281,033 B2 | 10/2007 | Le Leannec et al. | |
| 7,382,923 B2 | 6/2008 | Onno | |
| 7,499,546 B2 | 3/2009 | Donescu et al. | |
| 7,567,716 B2 | 7/2009 | Henry et al. | |
| 7,571,316 B2 | 8/2009 | Onno et al. | |
| 7,580,578 B1 | 8/2009 | Onno et al. | |
| 7,746,332 B2 | 6/2010 | Le Leannec et al. | |
| 7,912,985 B2 | 3/2011 | Le Leannec et al. | |
| 7,936,938 B2 | 5/2011 | Gisquet et al. | |
| 8,218,618 B2 | 7/2012 | Gisquet | |
| 8,462,854 B2 | 6/2013 | Henocq et al. | |
| 8,482,758 B2 | 7/2013 | Onno et al. | |
| 8,538,176 B2 | 9/2013 | Closset et al. | |
| 8,630,343 B2 | 1/2014 | Le Leannec et al. | |
| 8,650,469 B2 | 2/2014 | Gisquet et al. | |
| 8,654,843 B2 | 2/2014 | Onno et al. | |
| 8,711,945 B2 | 4/2014 | Henocq et al. | |
| 8,897,362 B2 | 11/2014 | Le Leannec et al. | |
| 8,942,286 B2 | 1/2015 | Le Leannec et al. | |
| 8,989,278 B2 | 3/2015 | Henry et al. | |
| 9,124,953 B2 | 9/2015 | Henocq et al. | |
| 9,532,070 B2 | 12/2016 | Laroche et al. | |
| 2007/0160138 A1* | 7/2007 | Wedi | H04N 19/46 375/240.03 |
| 2008/0130736 A1 | 6/2008 | Onno et al. | |
| 2008/0240235 A1* | 10/2008 | Holcomb | H04N 19/176 375/240.03 |
| 2009/0041132 A1 | 2/2009 | Le Floch et al. | |
| 2009/0278956 A1 | 11/2009 | Le Leannec et al. | |
| 2009/0290648 A1 | 11/2009 | Onno et al. | |
| 2009/0310674 A1 | 12/2009 | Le Leannec et al. | |
| 2010/0316139 A1 | 12/2010 | Le Leannec et al. | |
| 2011/0110431 A1 | 5/2011 | Laroche et al. | |
| 2011/0188573 A1 | 8/2011 | Laroche et al. | |
| 2012/0117133 A1 | 5/2012 | Henry et al. | |
| 2012/0163479 A1 | 6/2012 | Gisquet et al. | |

OTHER PUBLICATIONS

JP H08-009375 A.

Quantization with Frequency Dependent Dead-Zone (QFDDZ) article.

Kei-ichi Chono, et al., "Quantization with Frequency Dependent Dead-Xone (QFDDZ) for AVC's Subjective Quality Improvement," NEC, Media and Information Research Laboratories, NEC Corporation, Mar. 8, 2004, p. 50.

Jun. 8, 2018 European Search Report in European Patent Appln. No. 17306812.3.

James I. Gimlett, "Use of 'Activity' Classes in Adaptive Transform Image Coding," IEEE Transactions on Communications, IEEE Service Center, Piscataway, NJ, USA, vol. 23, No. 7, Jan. 1975, pp. 785-786.

* cited by examiner

METHOD AND DEVICE FOR ENCODING VIDEO DATA

This application claims the benefit under 35 U.S.C. § 119(a)-(d) of European Patent Application No. 17306812.3, filed on Dec. 18, 2017 and entitled "METHOD AND DEVICE FOR ENCODING VIDEO DATA". The above cited patent application is incorporated herein by reference in its entirety.

FIELD OF THE INVENTION

The present disclosure concerns a method and a device for encoding video data. It concerns more particularly the optimization of quantization parameters and processes.

BACKGROUND OF THE INVENTION

Predictive encoding of video data is based on the division of frames into blocks of pixels. For each block of pixels, a predictor block is searched for in available data. The predictor block may be a block in a previous frame, or generated from neighboring, previously encoded/decoded pixels in the current frame. Different encoding modes are defined according to different ways of determining the predictor block. The result of the encoding is an indication of the predictor block and a residual block consisting in the difference between the block to be encoded and the predictor block.

The encoding of residual blocks is based on three main steps consisting in transformation, quantization and finally entropy encoding of the remaining information.

Transformation consists in defining a new partition of the frame into blocks that are here called "transform unit", according to the HEVC vocabulary, and then applying a transform to the transform unit elements. The transformation is typically aimed at transforming the spatial values in the transform unit to frequency coefficients resulting in a transform unit comprising coefficients.

Quantization consists in scaling the magnitudes of these coefficients, ideally setting a majority of them to zero when the resulting degradation of the image is considered acceptable. High frequency coefficients are often good candidates to be set to zero based on the fact that they define fine details in the image that can be discarded without degrading the resulting image too severely.

Quantization of a transform coefficient typically consists in determining a scaled coefficient based on the transform coefficient by multiplying the transform coefficient by a factor parameter and next adding a deadzone parameter. The scaled coefficient is then shifted to obtain the quantized coefficient. The deadzone parameter allows controlling the rounding of the quantized coefficient and thus impacting the encoding result. The thorough determination of the deadzone parameter is therefore an issue of encoding processes.

SUMMARY OF INVENTION

The present invention has been devised to address one or more of the foregoing concerns. It concerns an encoding method comprising an improved quantization method. The proposed method produces lower bitrate for a given quality than known methods such as the Rate-Distorsion Optimized Quantization algorithm.

According to a first aspect of the invention there is provided a method for encoding a video sequence, comprising the following steps by a processing unit of an encoding device:

splitting an image from the video sequence into blocks of values;
for each block:
  transforming the values of the block into transform coefficients;
  organizing these transform coefficients into several sets of transform coefficients;
  quantizing the transform coefficients into quantized coefficients;
  encoding the block using the quantized coefficients;
encoding the video sequence based on the encoding of the blocks;
  wherein the quantizing step further comprises for quantized coefficients corresponding to one set of transform coefficients:
  determining scaled coefficients where a scaled coefficient is based on a transform coefficient of the one set, by multiplying the transform coefficient by a factor parameter and then adding a deadzone parameter, the deadzone parameter being scaled linearly with the index k of the transform coefficient within the set of transform coefficients;
  shifting each scaled coefficient to obtain a corresponding quantized coefficient;
  comparing a sum value representative of a summing result of magnitudes of the quantized coefficient values corresponding to the set of transform coefficients, with a threshold; and
  setting the quantized coefficients corresponding to the set of transform coefficients to zero, if the summing result is below the threshold.

In an embodiment, for each transform coefficient, the deadzone parameter $DZ_{k,j}$ is computed according to the equation:

$$DZ_{k,j} = DZ - c \cdot k; \text{ where}$$

j is the index of the set of transform coefficients in the block;
DZ is a global deadzone parameter; and
c is a constant parameter.

In an embodiment, the constant c is initialized with a first value C1 for a given block and changed to a second value C2 when a first set of transform coefficients whose corresponding quantized coefficients have not been all set to zero, is encountered.

In an embodiment, the method is applied to HEVC, the block is the transform unit and the set of transform coefficients is the coefficient group.

According to another aspect of the invention there is provided an encoding device for encoding a video sequence, comprising a processing unit configured for:

splitting an image from the video sequence into blocks of values;
for each block:
  transforming the values of the block into transform coefficients;
  organizing these transform coefficients into several sets of transform coefficients;
  quantizing the transform coefficients into quantized coefficients;
  encoding the block using the quantized coefficients;
encoding the video sequence based on the encoding of the blocks;
  wherein the quantizing step further comprises for quantized coefficients corresponding to one set of transform coefficients:

determining scaled coefficients where a scaled coefficient is based on the transform coefficient of the one set, by multiplying the transform coefficient by a factor parameter and then adding a deadzone parameter, the deadzone parameter being scaled linearly with the index k of the transform coefficient within the set of transform coefficients;

shifting each scaled coefficient to obtain a corresponding quantized coefficient;

comparing a sum value representative of a summing result of magnitudes of the quantized coefficient values corresponding to the set of transform coefficients, with a threshold; and setting the quantized coefficients corresponding to the set of transform coefficients to zero, if the summing result is below the threshold.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

At least parts of the methods according to the invention may be computer implemented. Accordingly, the present invention may take the form of an embodiment implemented entirely in hardware, an embodiment implemented entirely in software (including firmware, resident software, microcode, etc.) or an embodiment having an implementation combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

The context of the invention is that of video encoding. The global encoding process will now be described in relation to FIG. 1.

Figure 1:
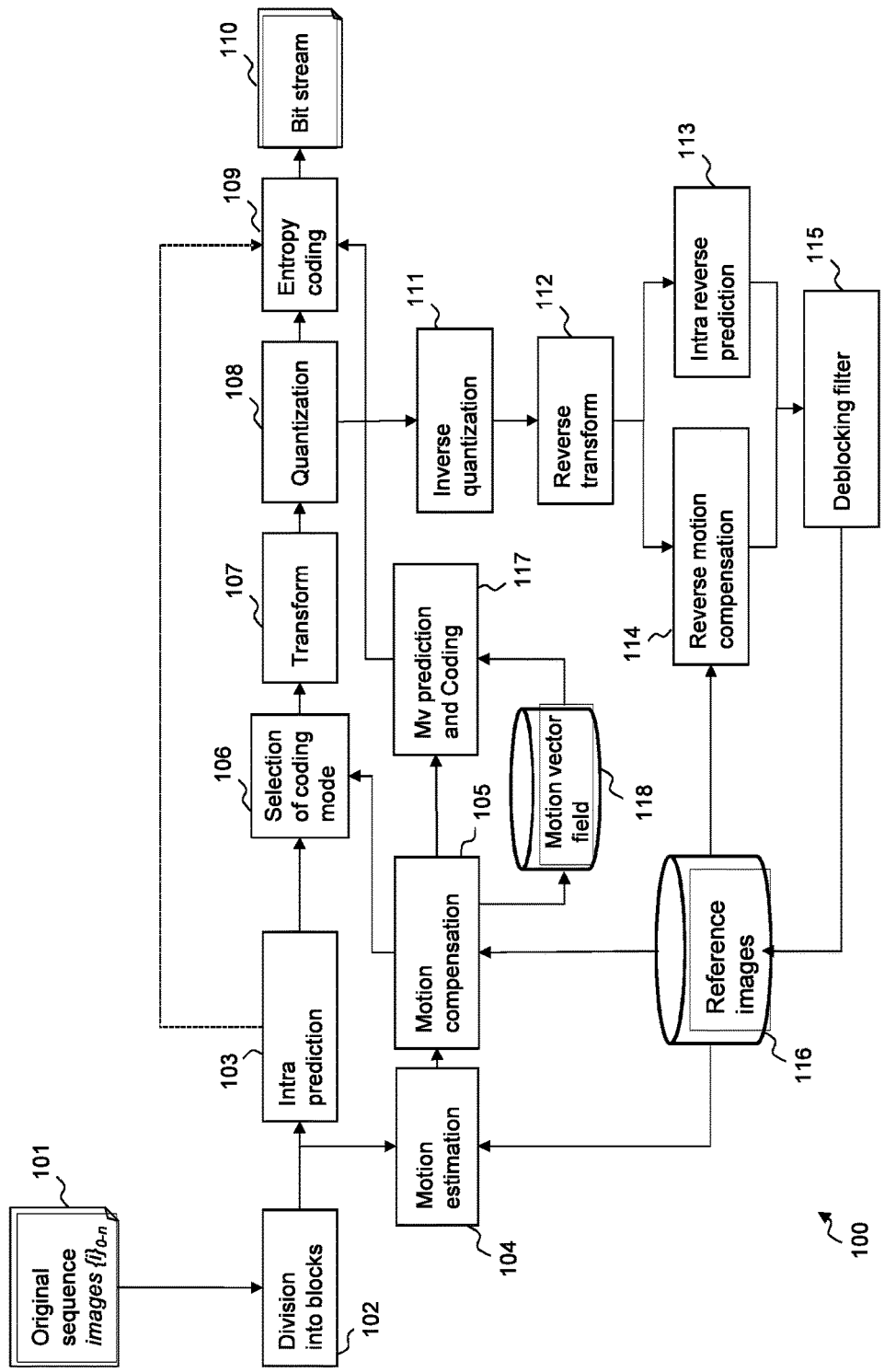
FIG. 1 illustrates a process of encoding from original sequence images to an encoded bitstream.

FIG. 1 illustrates a process of encoding from an original sequence of images to an encoded bitstream. This is a generic description, the details of which are not all relevant to the invention and are thus here only for the sake of illustration. An original sequence of digital images $i_0$ to $i_n$ 101 is received as an input by an encoder carrying out the steps of the encoding process 100. Each digital image is represented by a set of samples, known here as pixels. A bit stream 110 is output by the encoding process 100.

The input digital images $i_0$ to $i_n$ 101 are divided into blocks of pixels during step 102. The blocks correspond to image portions and may be of variable sizes (e.g. 4×4, 8×8, 16×16, 32×32, . . . pixels). A coding mode is selected for each input block or coding unit in step 106. Two families of coding modes are provided: coding modes based on spatial prediction (known as Intra prediction), hereafter INTRA, and coding modes based on temporal prediction (for example Inter coding, Merge or SKIP), hereafter INTER. The possible coding modes are evaluated. The evaluation may consist in determining a score that will be used by step 106 to select the mode with the best score. This score can be distortion-based (e.g. SAD) or more refined, such as the classical rate-distortion optimization, typically the Lagrangian optimization where the distortion is minimized under a rate constraint.

Step 103 implements INTRA, in which a given block to be encoded is predicted by a predictor computed from already decoded pixels of the neighbourhood of said block to be encoded. An indication of the selected INTRA predictor and the difference between the given block to encode and its predictor, called the residual block, is encoded. implements INTRA, in which a given block to be encoded is predicted by a predictor computed from already decoded pixels of the neighborhood of said block to be encoded. An indication of the selected INTRA predictor and the difference between the given block to encode and its predictor, called the residual block, is encoded.

Temporal prediction is implemented by motion estimation in a module 104 and in a motion compensation step 105. Firstly, a reference image from among a set of reference images 116 is selected. A portion of the reference image, also called reference area or image portion is selected during the motion estimation step 104. This selection is typically made by finding the most similar corresponding block in the reference images, taking into account the rate of signalling in the bitstream of the selected block. A motion compensation step 105 then predicts the block to be encoded using the selected area. The difference between the selected reference area and the given block, called a residual block, is computed by the motion compensation step 105. The selected reference area is indicated by a motion vector (Mv). This scheme can be extended by selecting several reference images.

Thus, in both cases, spatial and temporal predictions, a residual is computed by subtracting the prediction from the original data. In the INTRA prediction implemented during step 103, a prediction direction is encoded. In the temporal prediction, at least one information item representing the motion, for instance a motion vector (Mv), is encoded.

To further reduce the bitrate, the motion vector is encoded by difference with respect to a selected motion vector predictor. One set of motion information predictors is obtained from a motion vector field 118 by a motion vector prediction and coding step 117.

As mentioned above the encoding process 100 comprises a selection step 106 for selection of the coding mode by applying an encoding cost criterion, such as a rate-distortion criterion.

To further reduce redundancies, a transform is applied by transform step 107 to the residual block, the transformed data obtained is then quantized by quantization step 108 and entropy encoded by entropy encoding step 109. Finally, the encoded residual block of the encoded block is inserted into the bitstream 110, along with the information relative to the predictor used such as the index of the selected motion vector predictor.

For the blocks encoded in 'SKIP' mode, only an index to the predictor is encoded in the bitstream, without any residual block or residual motion vector. Similarly, the Merge mode also signals that no residual motion vector is transmitted, although a residual block may be.

The encoding process 100 also performs decoding of the encoded image to produce a reference image for the motion estimation of the subsequent images. This enables the encoder and the decoder receiving the bitstream to have the same reference frames. The inverse quantization step 111 performs inverse quantization of the quantized data, followed by an inverse transform in a reverse transform step 112. The reverse intra prediction step 113 uses the prediction information to determine the predictor to be used for a given block and the reverse motion compensation step 114 adds the residual obtained by step 112 to the reference area obtained from the set of reference images 116. Optionally, a deblocking filter step 115 is applied to remove the blocking effects and enhance the visual quality of the decoded image. The same deblocking filter is applied at the decoder, in order to ensure that, if there is no transmission loss, the encoder and the decoder apply the same processing.

In this encoding process, the invention concerns the encoding of residual blocks. The residual block is a block of values having the same size as the input block (coding unit). Each value is a difference between the pixel value of the predictor block and the corresponding pixel value of the coding unit. Values in the residual block are therefore signed integers.

The purpose of predictive encoding is to decrease the magnitudes of the values in the block to encode at the price of indicating the predictor block. The term magnitude in this document designates the absolute value. It is easy to understand that a good predictor block, meaning that it has pixel values very close to the pixel values of the coding unit, leads to a residual block comprising low magnitude values that may be very efficiently encoded.

Encoding residual blocks comprises three main steps, namely the transform, the quantization and the actual encoding called entropy coding. These steps are represented by steps 107, 108 and 109 in FIG. 1.

The basic idea behind the transform step 107 is to deal with frequencies in the digital image to encode. In a digital image, the highest frequencies correspond to the finest level of detail. This highest level of detail may be removed from the digital image with a low degradation perception for the user and a real saving in the quantity of data to encode. To deal with these frequencies it is necessary to transform the coding unit in the frequency domain. Several transforms may be used such as the DCT (Discrete Cosine Transform) or the DST (Discrete Sine Transform). These transforms make it possible to obtain a block of coefficients, in the frequency domain, corresponding to the residual block, in the spatial domain.

The quantization step 108 deals with further reducing the magnitude of coefficients and even nullifying some of them. The entropy coding step 109 is responsible for encoding the remaining, quantized, coefficients.

HEVC, as well as many other encoding standards, is not limited to a single transform in step 107. Beside the size, as later illustrated, space-frequency transforms such as DCT or DST, or no transform, can be selected. Whether the outputs are transformed or not, they can be quantized in step 108, but HEVC allows quantization to be skipped too. Therefore, step 109 may receive quantized or non-quantized information, which may be transform coefficients, or pixel residuals.

All the steps of the encoding process 100 are typically implemented in corresponding modules within an encoder device. These modules may be implemented in software or hardware.

Some aspects of HEVC related to steps 102, 108 and 109, will now be discussed.

Quantization affects the efficiency of encoding. An aggressive quantization, e.g. using large quantization step sizes, implies that less information is kept, but also that the amount of corresponding bitstream data generated is reduced.

The classical implementation, found in the reference software of HEVC for example, is thus presented here for the sake of simplicity.

For the $i^{th}$ coefficient DCT of a transform, its corresponding quantized coefficient $Q_i$ can be computed as follows:

$$Q_i = DCT_i/DIV;$$

where DIV is linked to the scalar quantizer, which is a parameter controlling the reduction of bitrate but also the loss of information and thus the quality of the obtained digital image. However, $DCT_i$ and $Q_i$ often need to be integers, and division operations are costly to implement, so the formula actually used becomes:

$$Q_i = (DCT_i * fct + DZ) >> shift;$$

where a scaled coefficient ($DCT_i * fct + DZ$) is generated and shifted to obtain the quantized coefficient.

The shift operation consists in moving bits to the right in the bitmap representing an integer. This is equivalent to dividing by 2 to the power of shift. One can see that these expressions are similar if $fct = 2^{shift}/DIV$.

However, because this is an integer operation, the result needs to be rounded to an integer. The value DZ, usually called the deadzone parameter, controls how much "rounding down" to the closest integer below occurs. A value of $2^{shift-1}$, equivalent to DIV/2, corresponds to rounding to nearest integer. But this value is critical in coding: larger values of $Q_i$ often imply a larger bitstream. As an example for HEVC, using the previous "round to nearest" (i.e. DIV/2) instead of the actually used rounding (corresponding to approximately DIV/3 and DIV/6 for DZ) causes a 20% loss in coding efficiency, i.e. it requires 20% more bandwidth/storage for the same quality.

The specifics in HEVC that are related to some aspects of the invention will now be detailed.

Figure 2:
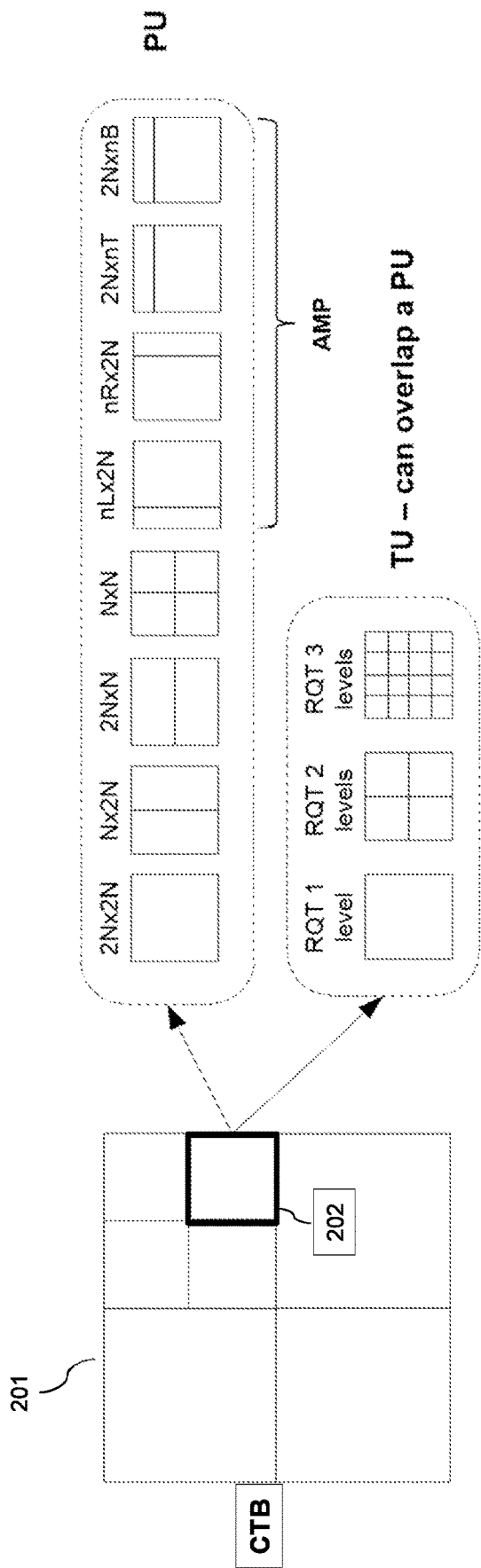
FIG. 2 illustrates different schemes for splitting a digital image into blocks of pixels as they are used in the encoding.

FIG. 2 illustrates different splitting of the digital image into blocks of pixels as they are used during the encoding.

The first type of block of interest here is the square unit called the Coding Tree Block (CTB) 201, which is then further subdivided into smaller square units, usually known as blocks, but more specifically called for HEVC the coding units 102 (CU), according to a quadtree. The CU 202 in FIG. 2 is now considered. There are two further splits of said CU 202. The prediction partitioning can be 2N×2N or N×N for INTRA coding, and any of 2N×2N, N×2N, 2N×N, as well as the Asymmetrical Motion Partitions (AMP) nL×2N, . . . 2N×nB for INTER. Each partition is then called a prediction unit (PU).

The Residual Quad Tree (RQT) splits said coding unit 202 into smaller square "transform" blocks, which are called transform units (TU). The quadtree is a type of tree well-known to the person skilled in the art, i.e. where leaves are split into four sub-leaves until a leaf node (i.e. not split) is reached. This allows efficient indication of how a CU is split into TUs.

In particular, the RQT contains flags to indicate which of the leaves of the quadtree are empty, i.e. quadtree leaves with no residual. If, according to the RQT, there are data in a transform unit, then information related to residuals is transmitted. Note that HEVC makes it possible to disable the transform in a TU, but both quantized residuals and quantized transform coefficients are coded similarly.

It should be noted that while transform units represent a splitting of the digital image, pixel values in transform units are typically residual values and not original pixel values of the digital image. These residual values represent the difference between the original pixel value and the pixel value of a predictor determined according to the chosen encoding mode.

Figure 3:
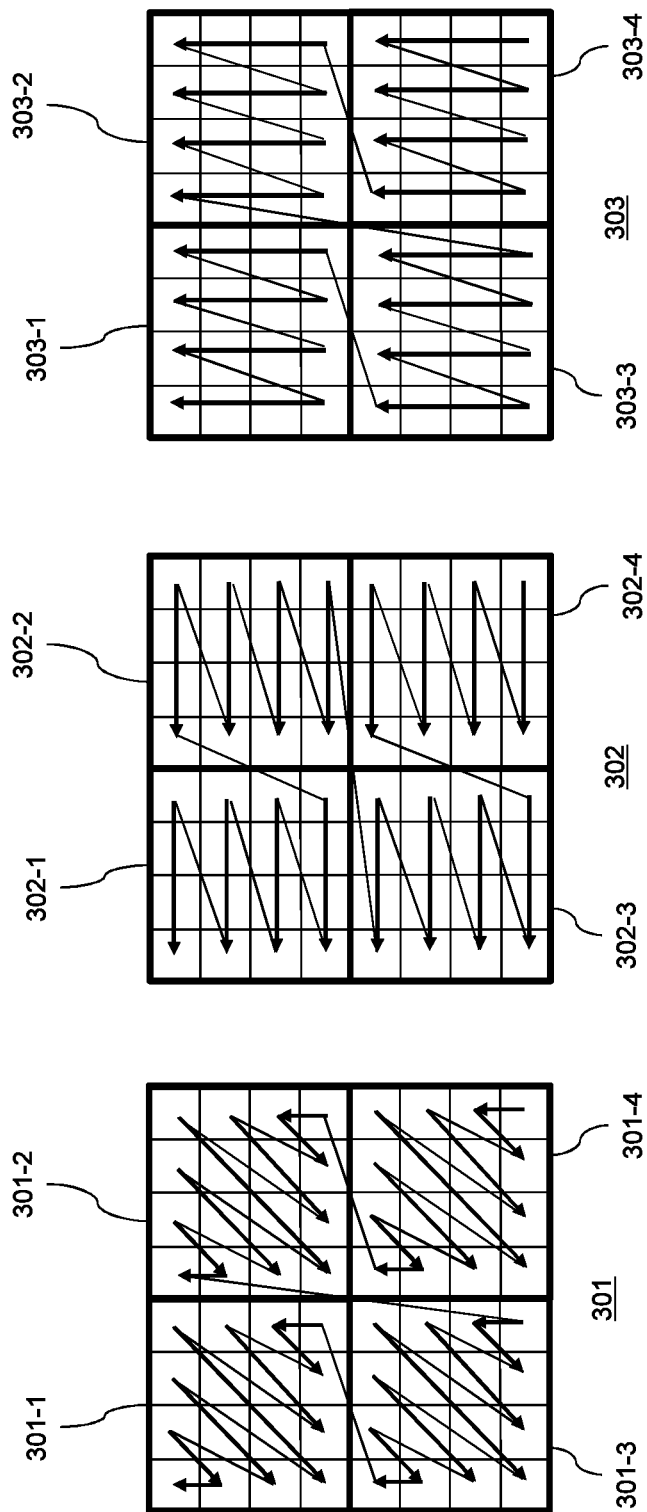
FIG. 3 illustrates coefficient groups and scan orders.

FIG. 3 illustrates coefficient groups and scan orders.

When using transform coefficients, residuals often have statistical biases on how they are spread in the transform unit. Correspondingly, scanning them in particular ways allows exploitation of these biases to reduce the amount of bitstream data generated.

Firstly, coefficients are organized in groups of 4×4 coefficients, commonly referred to as coefficient groups (CG). There are four such groups in an 8×8 transform unit 301, 302 and 303, referenced as 301-1, 301-2, 301-3 and 301-4 for transform unit 301 and similarly for TUs 302 and 303 in FIG. 3. During entropy encoding in HEVC, the presence of transform coefficients in a coefficient group is signalled by setting a coefficient group flag to the value 1. Note that in HEVC, the position of the last coefficient is transmitted, so the last non-empty coefficient group can be determined. Additionally, the first group, 301-1, 302-1 and 303-1, is always transmitted. When the block has been transformed, and thus contains transform coefficients, this first group holds the lowest frequencies, as DCT coefficients.

The order in which coefficients are included in the bitstream matters too. Firstly, it is in reverse order: the last coefficient is transmitted first. Besides this, there are horizontal and vertical scans for 4×4 and 8×8 transform units of the INTRA prediction mode for some cases (the details of which are irrelevant to the invention). In other cases, (INTER prediction, other cases of INTRA prediction), the scan is diagonal. Horizontal scan order is illustrated by transform unit 302, vertical scan order by transform unit 303 and diagonal scan order by transform unit 301.

FIG. 3 illustrates the overall design: starting with the last coefficient (its group implicitly being non-empty and the corresponding flag not being transmitted), which for the sake of explanation are groups 301-4, 302-4 and 303-4. Coefficients are scanned according to the pattern of coefficients inside the group. Once all information for coefficients in said group has been read according to said scan, the next group is tested. These are groups 301-2, 302-3 and 303-2: the coefficient scan order is thus also applied to the coefficient groups.

In any case, for each group that must be explicitly signalled (i.e. all except the first and last ones), a flag must be transmitted to determine whether said group holds residual data. This residual data is detailed in the next section.

Figure 4:
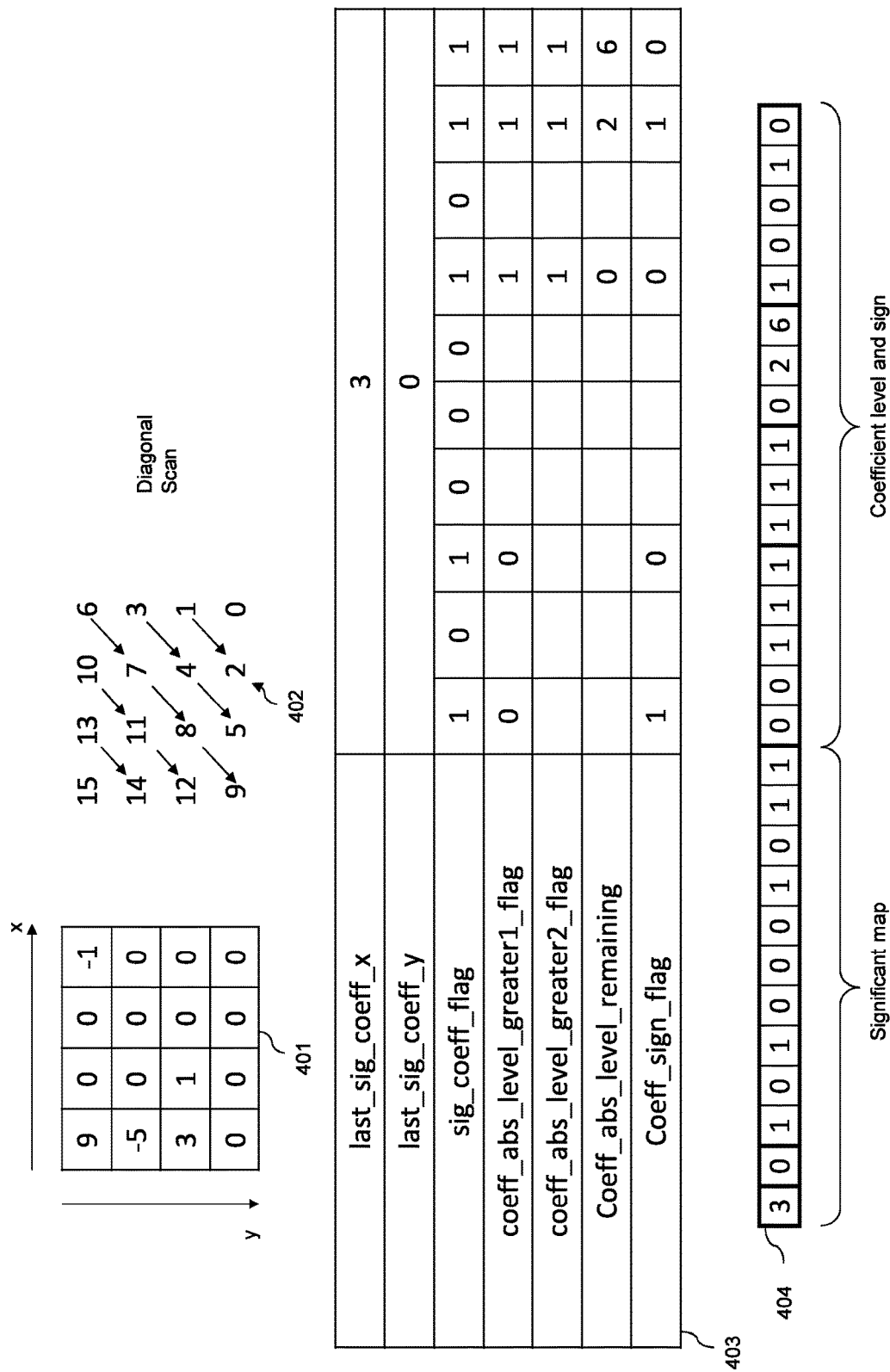
FIG. 4 illustrates how the residual data for a non-empty coefficient group are transmitted.

FIG. 4 illustrates how the residual data are transmitted for a non-empty coefficient group 401, but also serves to illustrate a 4×4 transform unit which contains a single coefficient group that is explicitly transmitted.

In particular, syntax elements named "last_sig_coeff_x" and "last_sig_coeff_y" are present to indicate for each transform unit the position of the last coefficient. More specifically, it allows the following information to be derived. The last coefficient group: as there is no coefficient after the last one, the corresponding coefficient group is empty; and within that last coefficient group, how many coefficients are present, the others having their 16 coefficients explicitly signalled.

Next, for each transmitted coefficient of the group according to the scan, a flag called "sig_coeff_flag" indicates whether the coefficient is zero: if it is, no other information is needed to know its value. This is very important, because transform residuals are very sparse after quantization, and zero is the most common value. Indeed, this flag is relevant to the presently presented processes.

Now that all non-zero coefficients are known, four iterative so-called maps of sequential information exist: each new map provides information about which coefficients need more information, i.e. about the next map.

The first map indicates whether each coefficient transmitted is non-zero ("sig_coeff_flag"): the decoder will have the complete map of flags decoded before moving to the next level.

The next map indicates for each non-zero coefficient, whether the coefficient magnitude is greater than 1 ("coeff_abs_level_greater1_flag").

The next map indicates for coefficient magnitudes greater than 1, if it is greater than 2 ("coeff_abs_level_greater2_flag").

The next map indicates for coefficient magnitudes greater than 2, the remainder of the magnitude (i.e. for a coefficient of magnitude "level", it is level-3) with a specific family of entropy codes ("Exponential-Golomb code of order 3", whose details are not important to the present invention).

The last map indicates the sign of the coefficient ("coeff_sign_flag") for all non-zero coefficients.

Each level of information is iteratively determined as it needs the previous one, and each level produces a so-called map.

FIG. 4 illustrates this encoding of the residual data. The coefficient group 401 contains coefficients. The coefficient group 401 is scanned according to the scan order illustrated by 402. This means that the coefficient group is scanned from the bottom right corner to the top left corner in the order of indexes of 402. In this scan order, the first coefficients are null, the first non-null coefficient encountered in this scan order is the top right coefficient with value −1. This corresponds to the so-called last significant coefficient, having its coordinates (3, 0).

Accordingly, table 403 illustrates the encoding of the coefficients. The first line of the table contains the value 3 corresponding to the x-coordinate of the first non-null coefficient −1. The second line of the table contains the value 0 corresponding to the y-coordinate of the first non-null coefficient −1. The third line corresponds to the significant coefficient map, beginning with the first non-null value −1 to the last value, in the scan order, corresponding to value 15 in the top left corner. For each remaining coefficient, it is indicated by the value '1' that the corresponding coefficient is non-null, and by the value '0' that the corresponding value is null. The sequence of remaining coefficients (−1, 0, 1, 0, 0, 0, 3, 0, −5, 9) corresponds to the map (1, 0, 1, 0, 0, 0, 1, 0, 1, 1) as indicated in the third line of the table.

For each non-null coefficient, the fourth line indicates whether the non-null coefficient has an absolute value greater than 1. Accordingly, the value corresponding to coefficients 3, −5 and 9 are indicated with a '1' value. The fifth line indicates which coefficient has an absolute value greater than 2, the same coefficients are indicated in the fifth line.

Next, the sixth line indicates the remaining value for each coefficient with an absolute value greater than 2. The remaining value corresponds to the absolute value of the coefficient minus 3. Accordingly, the sixth line indicates remaining values (0, 2, 6) corresponding to coefficients (3, −5, 9).

The seventh line indicates for each non-null coefficient the sign of its value. Accordingly, coefficients −1 and −5 have a '1' value in this line.

Table 404 illustrates the resulting sequence that is encoded in the bitstream corresponding to the actual values in table 403 in sequence. The first three lines correspond to the significant map, and the following to the coefficient level and sign.

In step 109 of FIG. 1, the produced values illustrated in 404 are entropy encoded using context-adaptive binary arithmetic coding (CABAC).

Shortened as CABAC, this encoding exploits the conditional probabilities of values from previous symbols (e.g. a flag, or syntax element) in the bitstream to efficiently encode following values of the corresponding symbols. This can be illustrated with two examples. Those probabilities are updated with each new symbol.

In FIG. 3, if one imagines the coefficient group 301-1 to be at some position in a transform unit (i.e. ignoring that it implicitly holds residual data for an 8×8 transform unit), the contextual part for coding its coefficient group flag consists in checking the values of the considered flag for its right and bottom neighbors (in raster scan order), which is one of {0, 0}, {1, 0}, {0, 1}, or {1, 1}. This allows a context to be derived, which leads to finding the conditional probability of said flag. Once it is read, its effective value is used to update said probability.

Similarly, in FIG. 4, each significant coefficient flag is arithmetically coded, and the conditional probability also depends on the values of the significant coefficient flags of its neighbors.

We have described here at length the case of HEVC, which was the first block-based encoding standard, to the inventors' knowledge, to introduce this concept of a subset of coefficients inside a spatio-frequency transform. Currently under study is the successor of HEVC, informally known as JVET (for Joint Video Exploration Team), its reference software implementation being called JEM (standing for Joint Exploration Model). JVET currently consists mainly of numerous additions on top of HEVC. Consequently, a lot of details concerning entropy coding have changed, in particular the derivation of contexts for coefficients. However, the coefficient group still exists, thus the described processes also apply. It should be noted that, whether the coefficient group size changes, or different subsets (including structures in-between the transform unit and the coefficient group, or non-square, etc), the described processes may quite simply be transposed.

Another example of a codec where the invention may apply is the AV1 codec scheduled to be the first codec released by the Alliance for Open Media, not yet completed. An example where it applies is for instance its particular division of frequencies into sub-bands, and the coding of particular information at this level.

As a consequence, it is understood that the use of HEVC-specific terms such as coding unit or transform unit could equally be replaced by coding block or transform block, or any corresponding terminology relating to a particular codec.

Figure 5:
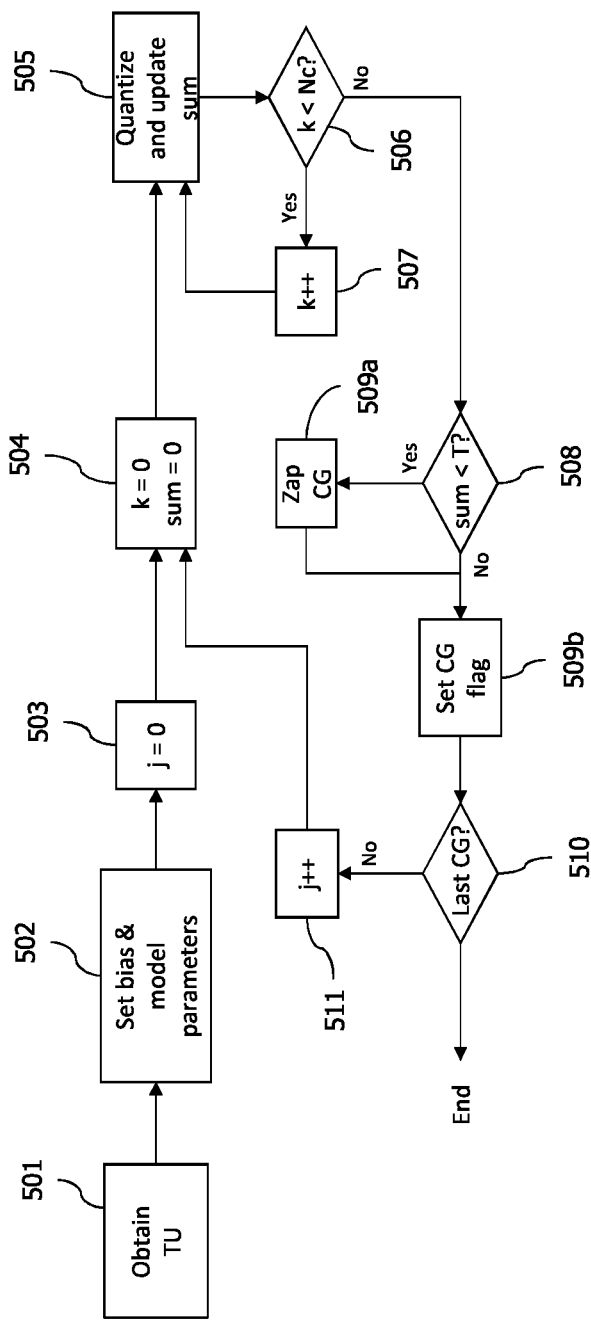
FIG. 5 illustrates steps of a zapping quantization process according to an embodiment of the invention.

FIG. 5 illustrates a zapping quantization process according to an embodiment of the invention.

The quantization process starts at step 501 with obtaining a given transform unit (TU); this step can be seen as an initialization of the process according to said TU, the details of which are irrelevant to the invention. Given said transform unit, various properties are thus known, such as the transform unit size, its type (INTER or INTRA prediction) or its slice type. Therefore, at step 502, the encoder selects the various settings of the quantization, as well as the zapping (quantization) model parameters, according to the transform unit properties. In particular, it will select the appropriate deadzone for use in the quantization formula, as well as the model parameters for the zapping decision, such as threshold T used at step 508. These parameters may be empirically determined in advance and are constant in a preferred embodiment. For instance, for large transforms, said model parameters may be selected to result in less frequent zapping; for example by lowering the T values for these transforms.

The quantization process then starts operating on coefficient groups by selecting the first one at step 503, namely the variable j relates to a coefficient group index. Note that at this level, coefficient groups are processed independently, so no particular order in which coefficient groups are processed is needed, but can be the natural order (as seen in FIG. 3 or 4) in which the bitstream is laid out.

At step 504, the process then initializes processing for the currently selected coefficient group: the first coefficient (again, no particular order needed here) is selected, namely the variable k which refers to a coefficient index within the coefficient group. In the same step the value of the zapping criterion, a sum of magnitudes, is initialized to 0.

The iteration variables j and k are chosen so that they are not confused with the variable i used in describing the typical quantization process above. The index i refers to an index of coefficients within the transform unit, not the coefficient group. Index i is related to the frequency. There is a bijective relation between i and the pair (j, k), i.e. there is a unique pair of values j and k for each existing value of i, and vice versa.

Finally, another feature concerns the first coefficient group (j=0): as it is implicitly signalled, the zapping process may be specifically adapted. An embodiment consists in decreasing the value of T in step 508 in this case. Another embodiment consists in initializing sum on step 504 to a value strictly greater than 0 (effectively equivalent to lowering T).

The quantized value is produced in step 505 for the current coefficient, for example using a formula already described consisting in shifting a scaled coefficient: Q=(DCT*fct+DZ)>>shift, with the deadzone provided by step 502, and updates the sum. Updating the sum consists typically in adding the magnitude of the current quantized coefficient to the sum.

As the encoder is tailored to HEVC, it is checked in step 506 whether the Nc coefficients in the current coefficient group have been processed. In all coefficient groups except the last one, Nc is 16. For the last one, Nc can be deduced from the values of last_sig_coeff_x and last_sig_coeff_y, as described above. If there are still coefficients to process, it selects the next one at step 507 before looping back to step 505.

Otherwise, the current coefficient group has been processed, and the final value of the sum is known. Therefore, step 508 checks whether the sum is below the predefined threshold T. If such is the case, it is advantageous to zap the current coefficient group, which happens at step 509a. As a consequence of this, its corresponding flag, set to 0 at step 509b, will indicate that it is empty. Zapping a coefficient group means setting all its coefficients to zero.

In all cases, processing goes to step 509b, where the coefficient group flag is set according to the content of the coefficient group: if it is empty, meaning that all quantized coefficients are null, the flag is 0, otherwise 1. Next, step 510 checks whether all coefficient groups have been processed. If not, step 511 selects the next coefficient group before looping back to step 504. Otherwise, the transform unit has been fully processed, and the values of quantized coefficients have been determined. Deriving corresponding syntax elements, including coefficient group flags, to be written in the bitstream is then possible.

According to the described process, the quantization allows to set to zero all quantized coefficients in a coefficient group when a value representing a summing result of the magnitudes of the quantized coefficients of the group is below a predefined threshold. This technique constitutes a very efficient way to perform a quantization optimized for a rate/distortion criterion, without the usual high complexity that such optimization often requires. Compared to a non-optimized quantization, the resulting video quality is increased for the same rate, at the price of a minor complexity increase.

Figure 6A:
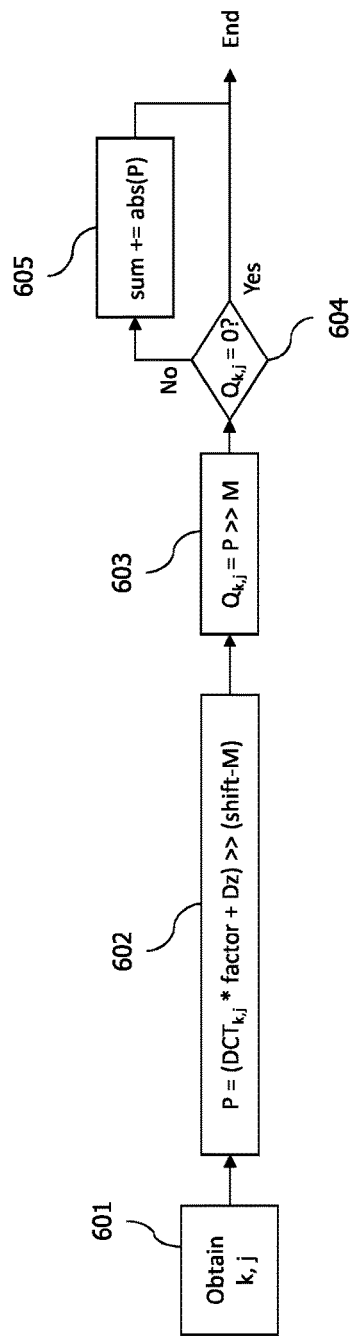
FIG. 6*a* illustrates steps of an alternative embodiment of the zapping process.

FIG. 6a describes an alternative embodiment of step 505 as described in relation to FIG. 5. In this embodiment, the quantization computation is split into two steps, the summing of the magnitudes being based on the intermediate quantization result.

As a reminder, the quantization in FIG. 5 was typically carried out by shifting the coefficient $DCT_{k,j}$ by a predefined shift value "shift". In a first step 601 the parameters k and j are obtained. In this embodiment, according to a predefined parameter M, the coefficient $DCT_{k,j}$ is first shifted by a first value corresponding to shift-M, resulting in an intermediate quantized result called P, in step 602. This intermediate quantized result P is next shifted by the value M, to obtain the resulting quantized coefficient $Q_{k,j}$ in a step 603. The person skilled in the art may therefore recognize P as a fixed-point representation of the float/rational quantized value where the M lowest bits relate to its decimal part, while $Q_{k,j}$ is the corresponding integer (after rounding). When the quantized coefficient $Q_{k,j}$ is not zero, tested in step 604, the magnitude of the intermediate result P is summed instead of summing the magnitude of $Q_{k,j}$ in step 605. When the process ends, it is worth noting that the resulting quantized coefficient has the same value as that obtained in the previous embodiment. The only difference is the sum value used in step 508 of FIG. 5 to determine the zapping of the whole coefficient group.

The sum of the magnitudes of the intermediate quantized results is higher than the sum of the quantized coefficients. Consequently, this would decrease the probability that the whole coefficient group is zapped, if the threshold T were not to be adapted. Similarly, this allows greater accuracy in the zapping decision; if based on magnitude (and resulting distortion), the decision would be much coarser, resulting in coefficient groups being zapped when they should not.

Figure 6B:
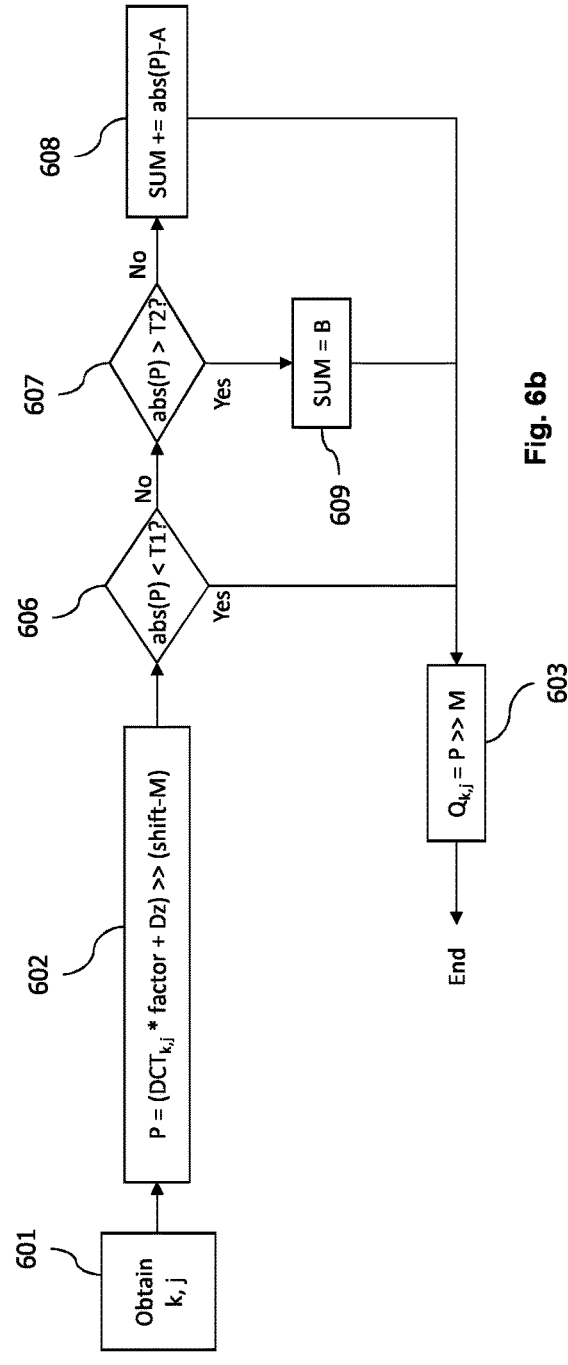
FIG. 6*b* illustrates steps of another alternative embodiment of the zapping process.

FIG. 6b illustrates another alternative embodiment of step 505 in FIG. 5.

According to a first aspect of this embodiment, two thresholds T1 and T2 are introduced on the magnitude of a single intermediate quantized coefficient P. These two thresholds define a range [T1, T2], T1 being lower than T2.

Intermediate quantized coefficients P with a magnitude below the lowest threshold T1 will not be considered in the decision to zap the whole coefficient group. Namely, their magnitude value will not be used to update the magnitude sum used as a criterion against the threshold T to zap the coefficient group. T1 is implementation-dependent, in the sense that T1 could be null, at the cost of the sum being larger. Lowering the value of T1 can also force the use of signed arithmetical operations. T1 may also represent the minimal magnitude for a coefficient that does not need to be quantized to 0 right away.

If at least one intermediate quantized coefficient P in the coefficient group has a magnitude above the highest threshold T2, the whole coefficient group is not zapped. This may be implemented by updating the sum with a large number to ensure that the sum will be larger than the threshold T when the test of step 508 occurs, or by lowering the threshold T with the same effect. T2 can be an empirically determined value, depending on the video coding standard, the encoder algorithms, noise levels and visual inspection. It generally represents the threshold for magnitudes of coefficients above which coefficients represent too much information for them to be zapped.

It is worth noting that defining the threshold as depending on the number of quantized, or intermediate quantized, coefficients in the coefficient group having a magnitude comprised within a predefined range as done in this embodiment may be advantageously introduced in all embodiments herein described.

A particular implementation of this embodiment, the implementation described in FIG. 6b, defines two additional parameters A and B to express the threshold T as:

$$T=A*N+B;$$

where N is the number of intermediate quantized coefficients with a magnitude in the range [T1, T2], these intermediate quantized coefficients being called zappable coefficients.

It is worth noting that:

$$\Sigma_N |P| < T; \text{ with } T=A*N+B;$$

is equivalent to:

$$\Sigma_N (|P|-A) < B.$$

This implementation is illustrated in FIG. 6b with the threshold T being replaced by threshold B in step 508.

In a first step 601 corresponding to similar step 601 of FIG. 6a, coordinates k and j of the coefficient are obtained.

In next step 602 corresponding to similar step 602 of FIG. 6a, the intermediate quantized coefficient P is computed.

In step 606, if the value of the magnitude of the intermediate quantized coefficient P is below the value of the threshold T1, then the quantization is finalized in step 603 corresponding to similar step 603 of FIG. 6a. There is no update of the sum.

In step 607, if the value of the magnitude of the intermediate quantized coefficient P is above the value of the threshold T2, then the sum is forced to the value B to ensure that the test done in step 508 will never trigger the zapping of the whole coefficient group. As a reminder, the value B is used as the threshold instead of T in this implementation.

If the magnitude of the intermediate quantized coefficient P is in the range [T1, T2], then in step 608, the sum is updated with the magnitude minus the parameter A.

In any case, the quantization of the coefficient is finalized in step 603 before the end of the process.

According to this embodiment, the test may occur using a value T corresponding to A*N+B, without the need to compute N.

It should be noted that playing with the values of the thresholds T1 and T2, the model parameter A and the precision M makes it possible to guarantee a range for the value of SUM. Doing so offers implementation trade-offs, e.g. reducing the bitdepth of the variables, and thus reducing implementation costs (circuitry size, energy consumption, etc.) of the operations used by the zapping method. In a particular embodiment, M=0, i.e. $P=DCT_{k,j}*fct_{k,j}+DZ$. It should be obvious to the person skilled in the art that all parameters described previously (DZ, A, B, T1 and T2) can be scaled accordingly to account for this, up to the point where $P=DCT_{k,j}+DZ$.

In all these embodiments, the factor fct and the deadzone Dz may be dependent on the coordinates k and j. Namely the equation $Q_{k,j}=DCT_{k,j}*fct+DZ$, becomes $Q_{k,j}=DCT_{k,j}*fct_{k,j}+DZ_{k,j}$. Accordingly, the importance of some coefficients may be made greater. Typically, low frequency coefficients can be emphasized.

Figure 7:
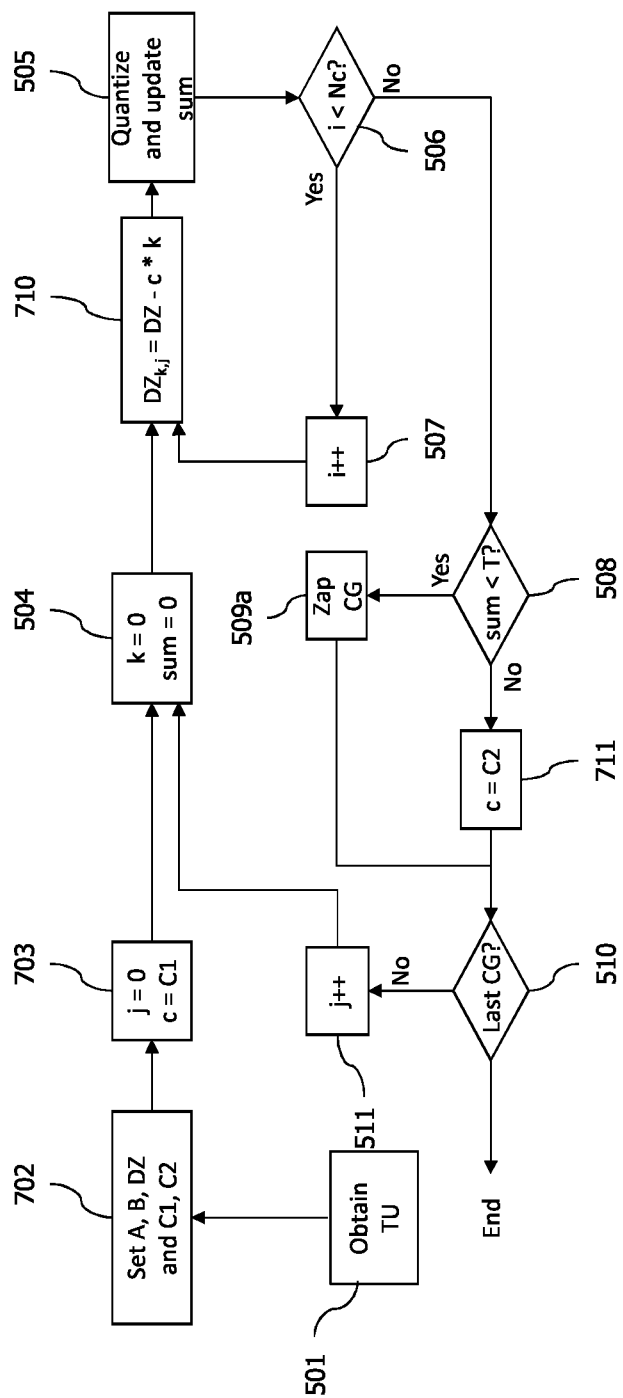
FIG. 7 illustrates steps of a method to determine a deadzone parameter.

FIG. 7 illustrates a method to determine the deadzone $DZ_{k,j}$ based on k and j and a new parameter c.

The proposed method for determining the deadzone parameter $DZ_{k,j}$ is based on a global deadzone parameter DZ which is scaled linearly with the index k of the coefficient within the coefficient group. A constant c is defined to control the amount of scaling applied. Namely the deadzone parameter $DZ_{k,j}$ is determined for each coefficient having coordinates k and j according to the following equation:

$$DZ_{k,j}=DZ-c\cdot k;$$

Indeed, it is known to the person skilled in the art to try forcing more of the higher frequencies (i.e. larger values of i) in a transform unit to 0, in particular by using the traditional signalling known as "end-of-block". This is typically done through the use of quantization matrices, which have an impact on the $fct_{k,j}$ term (usually decreasing). The goal is both to avoid coding visually less important information (such as high frequencies), and to optimize syntax elements similar to last_sig_coeff_x/y (e.g. the End-Of-Block signalling of JPEG or other transform-based codecs). But here, the intent is different and relies on the contextual coding of the sig_coeff_flag of each coefficient within the coefficient group. Indeed, the CABAC context, meaning the probabilities, for this flag depends on the values of the respective flags for the coefficients immediately to the right and below the current one. The first coefficients (lower values of k) of the coefficient group are comparatively more important than those at the end (higher values of k), and more likely to be non-null (sig_coeff_flag of value 1). Encoding flags with the value 0 at the end of the coefficient group are more likely to generate less data if the previously coded flags are 0. Conversely, flags with the value 1 at its start are more likely to generate less data if these flags with larger values of k have values of 1. Furthermore, to increase the probability of zapping a coefficient group, the higher frequencies should be both quantized more heavily and account for less in the sum used for deciding whether to zap the coefficient group. This weighting only based on index k is therefore a means to consider this aspect and achieve the intended result of zapping less important coefficient groups.

In a particular embodiment, the constant c takes two different values C1 and C2, C1 being greater than C2. The constant c is initialized with C1 and changed to C2 when the first coefficient group that is not zapped has been encountered. The idea is that having the last coefficient later in the coding order will result in bitrate reduction. Therefore, until a non-zero coefficient group is found, coefficients should be quantized slightly more.

FIG. 7 illustrates this particular embodiment in combination with the zapping method presented in relation to FIG. 5. Identical steps have received the same reference number and are not described here.

Step 702 corresponds to step 502 with the addition of determining parameters C1 and C2. Their value is highly dependent on M, and can be further adapted to the transform type and size, as well as the slice type. In the simplest case, and for the sake of illustration, C1 is respectively 0.2 for intra slices and 0.1 otherwise, while C2 is ½, or even 0.

Step 703 corresponds to step 503 with the addition of initializing the constant c with value C1.

In step 710, for each coefficient, the deadzone parameter is computed according to the proposed equation.

In step 711, when the test of step 508 is negative, indicating that the whole coefficient group is not zapped, constant c takes the value C2. It may be noted that constant c, initialized with value C1, keeps this value while the coefficient groups within the transform unit are zapped and switched to value C2 after the encoding of the first non-zapped coefficient group.

Figure 8:
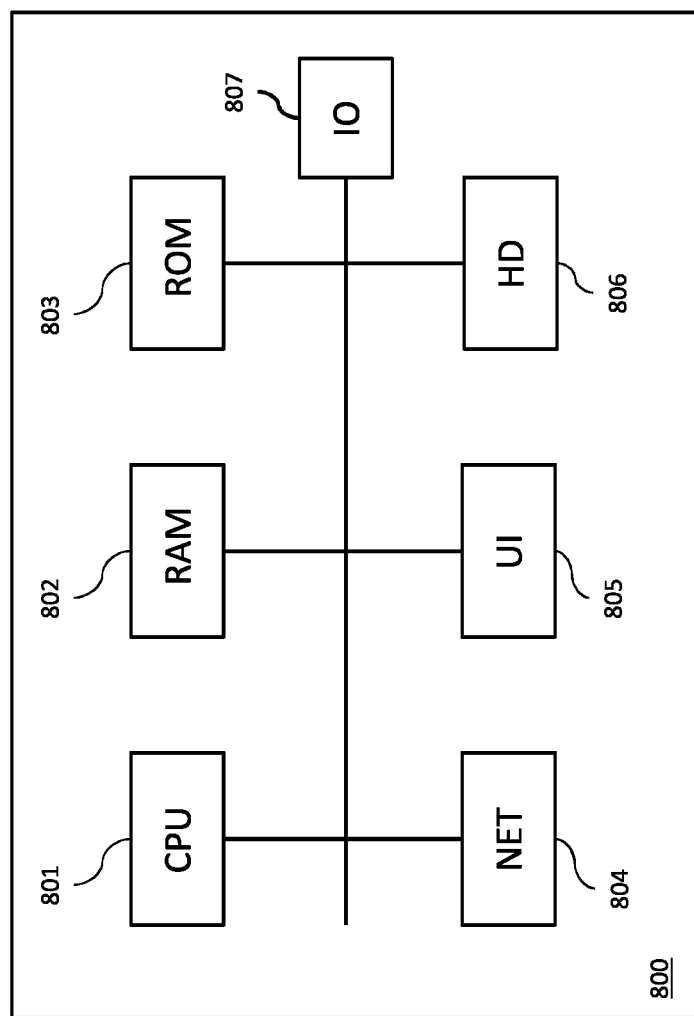
FIG. 8 is a schematic block diagram of a computing device for the implementation of one or more embodiments of the invention.

FIG. 8 is a schematic block diagram of a computing device 800 for the implementation of one or more embodiments of the invention. The computing device 800 may be a device such as a micro-computer, a workstation or a light portable device. Other examples of a computing device include a custom made processing device implemented in an integrated circuit, an ASIC ("Application-Specific Integrated Circuit"), a system-on-chip (SoC), an FPGA ("Field-Programmable Gate Array"), or logical circuitry including discrete components. The computing device may for example form part of a camera, a monitoring camera, a door station, or an encoding device. The computing device 800 comprises a communication bus connected to:
- a processing unit 801 which may be any kind of processor, e.g., a central processing unit (CPU), a graphics processing unit (GPU), such as a microprocessor;
- a random access memory 802, denoted RAM, for storing the executable code of the method of embodiments of the invention as well as the registers adapted to record variables and parameters necessary for implementing the method for encoding or decoding at least part of an image according to embodiments of the invention. The memory capacity thereof can be expanded by an optional RAM connected to an expansion port for example;

a read only memory 803, denoted ROM, for storing computer programs for implementing embodiments of the invention;

a network interface 804 typically connected to a communication network over which digital data to be processed are transmitted or received. The network interface 804 can be a single network interface, or composed of a set of different network interfaces (for instance wired and wireless interfaces, or different kinds of wired or wireless interfaces). Data packets are written to the network interface for transmission or are read from the network interface for the reception under the control of the software application running in the processing unit 801;

a user interface (UI) 805 may be used for receiving inputs from a user or to display information to a user;

a hard disk 806 denoted HD may be provided as a mass storage device;

an I/O module 807 may be used for receiving/sending data from/to external devices such as a video source or display.

The executable code may be stored either in read only memory 803, on the hard disk 806 or on a removable digital medium for example such as a disk. According to a variant, the executable code of the programs can be received by means of a communication network, via the network interface 804, in order to be stored in one of the storage means of the communication device 800, such as the hard disk 806, before being executed.

The processing unit 801 is adapted to control and direct the execution of the instructions or portions of software code of the program or programs according to embodiments of the invention, which instructions are stored in one of the aforementioned storage means. After powering on, the processing unit 801 is capable of executing instructions from main RAM memory 802 relating to a software application after those instructions have been loaded from the program ROM 803 or the hard-disk (HD) 806 for example. Such a software application, when executed by the CPU 801, causes the steps of the method according to the invention to be performed.

Any step of the algorithm shown in FIGS. 5 to 7 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA or an ASIC.

Although the present invention has been described herein above with reference to specific embodiments, the present invention is not limited to the specific embodiments, and modifications, which lie within the scope of the present invention, will be apparent to a skilled person in the art.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for encoding a video sequence, the method comprising the following steps by a processing unit of an encoding device:
   splitting an image from the video sequence into blocks of values;
   for each block: (a) transforming the values of the block into transform coefficients;
   (b) organizing these transform coefficients into several sets of transform coefficients;
   (c) quantizing the transform coefficients into quantized coefficients; and (d) encoding the block using the quantized coefficients; and
   encoding the video sequence based on the encoding of the blocks,
   wherein the quantizing step further comprises for quantized coefficients corresponding to one set of transform coefficients:
   (1) determining scaled coefficients where a scaled coefficient is based on a transform coefficient of the one set, by multiplying the transform coefficient by a factor parameter and then adding a deadzone parameter, the deadzone parameter being scaled linearly with the index k of the transform coefficient within the set of transform coefficients;
   (2) shifting each scaled coefficient to obtain a corresponding quantized coefficient;
   (3) comparing a sum value representative of a summing result of magnitudes of the quantized coefficient values corresponding to the set of transform coefficients, with a threshold; and
   (4) setting the quantized coefficients corresponding to the set of transform coefficients to zero, if the summing result is below the threshold.

2. The method of claim 1, wherein, for each transform coefficient, the deadzone parameter $DZ_{k,j}$ is computed according to the equation:

$$DZ_{k,j} = DZ - c \cdot k; \text{ where}$$

j is the index of the set of transform coefficients in the block;
DZ is a global deadzone parameter; and
c is a constant parameter.

3. The method of claim 2, wherein the constant c is initialized with a first value C1 for a given block and changed to a second value C2 when a first set of transform coefficients, whose corresponding quantized coefficients have not been all set to zero, is encountered.

4. The method of claim 1, wherein the method is applied to HEVC, the block is the transform unit, and the set of transform coefficients is the coefficient group.

5. An encoding device for encoding a video sequence, the encoding device comprising a processing unit configured for:
   splitting an image from the video sequence into blocks of values;
   for each block: (a) transforming the values of the block into transform coefficients;
   (b) organizing these transform coefficients into several sets of transform coefficients;
   (c) quantizing the transform coefficients into quantized coefficients; and (d) encoding the block using the quantized coefficients; and encoding the video sequence based on the encoding of the blocks, wherein the quantizing step further comprises for quantized coefficients corresponding to one set of transform coefficients:

(1) determining scaled coefficients where a scaled coefficient is based on the transform coefficient of the one set, by multiplying the transform coefficient by a factor parameter and then adding a deadzone parameter, the deadzone parameter being scaled linearly with the index k of the transform coefficient within the set of transform coefficients;

(2) shifting each scaled coefficient to obtain a corresponding quantized coefficient;

(3) comparing a sum value representative of a summing result of magnitudes of the quantized coefficient values corresponding to the set of transform coefficients, with a threshold; and (4) setting the quantized coefficients corresponding to the set of transform coefficients to zero, if the summing result is below the threshold.

6. A computer program product for a programmable apparatus, the computer program product comprising a sequence of instructions for implementing a method according to claim 1, when loaded into and executed by the programmable apparatus.

7. A non-transitory computer-readable storage medium storing instructions of a computer program for implementing a method according to claim 1.

* * * * *